(12) United States Patent
Toot

(10) Patent No.: US 8,063,528 B2
(45) Date of Patent: *Nov. 22, 2011

(54) COUNTER-ROTATABLE GENERATOR

(75) Inventor: Peter David Toot, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 238 days.

This patent is subject to a terminal disclaimer.

(21) Appl. No.: 12/641,477

(22) Filed: Dec. 18, 2009

(65) Prior Publication Data

US 2011/0148237 A1  Jun. 23, 2011

(51) Int. Cl.
*H02K 16/02* (2006.01)
(52) U.S. Cl. ......... 310/114; 310/166; 310/168; 310/169
(58) Field of Classification Search .................. 310/114, 310/191, 266, 166, 168, 169, 156.34; H02K 16/02
See application file for complete search history.

(56) References Cited

U.S. PATENT DOCUMENTS

| | | | |
|---|---|---|---|
| 3,997,131 A | 12/1976 | Kling | |
| 4,251,987 A | 2/1981 | Adamson | |
| 4,644,207 A | 2/1987 | Catterfeld et al. | |
| 4,812,695 A | 3/1989 | Parshall | |
| 4,827,712 A | 5/1989 | Coplin | |
| 4,916,894 A | 4/1990 | Adamson et al. | |
| 4,969,325 A | 11/1990 | Adamson et al. | |
| 5,010,729 A | 4/1991 | Adamson et al. | |
| 5,038,607 A | 8/1991 | Baer et al. | |
| 5,083,040 A | 1/1992 | Whitford et al. | |
| 5,369,322 A | 11/1994 | Maruyama et al. | |
| 5,424,632 A | 6/1995 | Montagu | |
| 5,675,203 A * | 10/1997 | Schulze et al. | 310/113 |
| 5,783,894 A * | 7/1998 | Wither | 310/266 |
| 6,175,178 B1 | 1/2001 | Tupper et al. | |
| 6,211,597 B1 | 4/2001 | Nakano | |
| 6,380,653 B1 * | 4/2002 | Seguchi | 310/112 |

(Continued)

FOREIGN PATENT DOCUMENTS

EP  1653064 A2  5/2006

(Continued)

OTHER PUBLICATIONS

European Search Report, EP10167144, Mar. 5, 2011, 8 pages.

*Primary Examiner* — Quyen Leung
*Assistant Examiner* — David W. Scheuermann
(74) *Attorney, Agent, or Firm* — William Scott Andes; Steven J. Rosen

(57) ABSTRACT

A counter-rotatable generator includes a generator stator concentric with concentric counter-rotatable radially inner pole and outer magnet rotors. The magnet rotor encircles the pole rotor and the pole rotor encircles the generator stator. A rotor air gap is disposed between the magnet and pole rotors, and a transformer air gap is disposed between the pole rotor and the stator. The magnet rotor includes a circular array of magnets having circumferentially alternating north/south and south/north orientations, retained within a magnet retention ring, and the magnets are circumferentially separated from each other by non-magnetic material spacers. One stator includes an annular hub, axial windings around equi-distantly spaced axial poles on the annular hub, radial cores extending radially outwardly from and equi-angularly spaced about a pole hub on the annular hub between the first and second axial windings, and radial windings around the radial cores.

26 Claims, 16 Drawing Sheets

U.S. PATENT DOCUMENTS

| | | |
|---|---|---|
| 6,531,799 B1 | 3/2003 | Miller |
| 6,566,775 B1 | 5/2003 | Fradella |
| 6,700,242 B2 * | 3/2004 | Kawamura ............... 310/68 R |
| 6,710,492 B2 | 3/2004 | Minagawa |
| 6,739,120 B2 | 5/2004 | Moniz et al. |
| 6,774,591 B2 | 8/2004 | Arimitsu et al. |
| 6,794,776 B1 | 9/2004 | Gabrys |
| 7,049,724 B2 | 5/2006 | Qu et al. |
| 7,216,475 B2 | 5/2007 | Johnson |
| 7,250,702 B2 | 7/2007 | Abou Akar et al. |
| 7,471,009 B2 | 12/2008 | Davis et al. |
| 7,489,060 B2 | 2/2009 | Qu et al. |
| 7,492,073 B2 | 2/2009 | Qu et al. |
| 7,508,157 B1 | 3/2009 | Gabrys |
| 2004/0070211 A1 | 4/2004 | Franchet et al. |
| 2004/0255590 A1 | 12/2004 | Rago et al. |
| 2005/0212380 A1 * | 9/2005 | Caroon ..................... 310/266 |
| 2006/0279153 A1 | 12/2006 | Barreiro |
| 2007/0084185 A1 | 4/2007 | Moniz et al. |
| 2008/0054739 A1 | 3/2008 | Lueck |
| 2008/0143115 A1 | 6/2008 | Kern et al. |
| 2009/0091204 A1 * | 4/2009 | Koshiba et al. ............. 310/114 |
| 2009/0201111 A1 | 8/2009 | Filatov |
| 2010/0326050 A1 * | 12/2010 | Schilling et al. ............. 60/268 |

FOREIGN PATENT DOCUMENTS

| | | |
|---|---|---|
| EP | 1931015 A2 | 6/2008 |
| JP | 01117633 A * | 5/1989 |
| WO | WO9929027 A1 | 6/1999 |

* cited by examiner

COUNTER-ROTATABLE GENERATOR

BACKGROUND OF THE INVENTION

1. Field of the Invention

The invention relates to electrical generators and motors and, more particularly, electrical generators and motors with counter-rotatable rotors.

2. Description of Related Art

Aircraft systems are increasingly being designed to accommodate greater and greater electrical loads as are other applications for generating electricity. Electrical power is extracted mechanically from the engines that power aircraft as well as other vehicles. When operating an aircraft engine at relatively low power levels, e.g., while idly descending from altitude, extracting electrical power from the engine mechanical power may reduce the ability to operate the engine properly. Current turbofan aircraft gas turbine engines requiring higher demands for aircraft power utilize very large generators mounted to a core engine driven gearbox. At flight conditions where lower thrust is required but high electric power such as approach, the core engine must run fast to keep up the demand but the resultant is more thrust which must be spoiled to maintain approach speeds thus reducing fuel efficiency.

Electrical power may be extracted from the high-pressure (HP) engine spool in a gas turbine engine. The relatively high operating speed of the HP engine spool makes it an ideal source of mechanical power to drive the electrical generators connected to the engine. However, it is desirable to draw power from other sources within the engine, rather than to rely solely on the HP engine spool to drive the electrical generators. The low-pressure (LP) engine spool provides an alternate source of power transfer, however, the relatively lower speed of the LP engine spool typically requires the use of a gearbox, as slow-speed electrical generators are often larger than similarly rated electrical generators operating at higher speeds. Electrical generators operating off the LP rotor or spool require large generators due to low speeds of the LP rotor or gearboxes to increase speed. These generators are a simple rotor and stator configuration.

Therefore, there is a need for an electrical generator for aircraft turbofan gas turbine and other engines that can be used to provide a great amount of electrical power over a wide range of engine operating speeds.

SUMMARY OF THE INVENTION

A counter-rotatable generator includes a generator stator and counter-rotatable radially inner pole and outer magnet rotors and all being concentric. In one embodiment of the counter-rotatable generator, the radially outer magnet rotor encircles the radially inner pole rotor, the radially inner pole rotor encircles the generator stator, a rotor air gap is disposed between the magnet and pole rotors, and a transformer air gap is disposed between the pole rotor and the stator. The magnet rotor includes a circular array of magnets having circumferentially alternating north/south and south/north orientations retained within a magnet retention ring and circumferentially separated from each other by non-magnetic material spacers.

A more particular embodiment of the pole rotor includes one or more pole assemblies having one or more pole hubs supporting one or more sets of axially extending rotatable bar poles respectively. Each of the bar poles includes an axially extending outer bar connected to a respective one of the pole hubs by a connector extending radially outwardly from the respective one of the pole hubs to the outer bar. Non-magnetic material is disposed axially and radially between the pole assemblies. The non-magnetic material may be in an arbor disposed axially and radially between the pole assemblies. The pole hubs and the bar poles are made of a magnetic steel.

A more particular embodiment of the stator includes axial windings around annular axial poles evenly distributed or equi-distantly spaced on a shaft or the annular hub and radial cores extending radially outwardly from a generally cylindrical or annular pole hub axially centered on the stator cylindrical shaft or the annular hub between the first and second axial windings. The radial cores are equi-angularly spaced about the pole hub and radial windings are wound around the radial cores.

An alternative stator includes a stator cylindrical shaft or annular hub sets of radial cores extending radially outwardly from and equi-distantly spaced on the stator cylindrical shaft or the annular hub. The radial cores in each of the sets are equi-angularly spaced about the stator cylindrical shaft or the annular hub and radial windings are wound around the radial cores.

The counter-rotatable generator may include the stator having a stator cylindrical shaft or annular hub with axially adjacent stator poles having Delta-connected and/or Y-connected stationary windings.

The stator may be Y-connected and the counter-rotatable generator multi-phase with an N number of phases. Then the stator cylindrical shaft or annular hub has the same N number of the Y-connected stationary windings and all the Y-connected stationary windings may be radial windings. A more particular embodiment of stator includes Y-connected stationary axial end windings at opposite ends of the shaft or annular hub and all the Y-connected stationary windings between the axial end windings being radial windings.

A counter-rotatable generator may have the Delta-connected stator and be multi-phase with an N number of phases. The stator cylindrical shaft or annular hub has N+1 number of the stator poles with the same N+1 number of the Delta-connected stationary windings. All the Delta-connected stationary windings are axial windings. A more particular embodiment of the stator includes Delta-connected stationary radial end windings at opposite ends of the shaft or annular hub and all the Delta-connected stationary windings between the axial end windings being axial windings.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
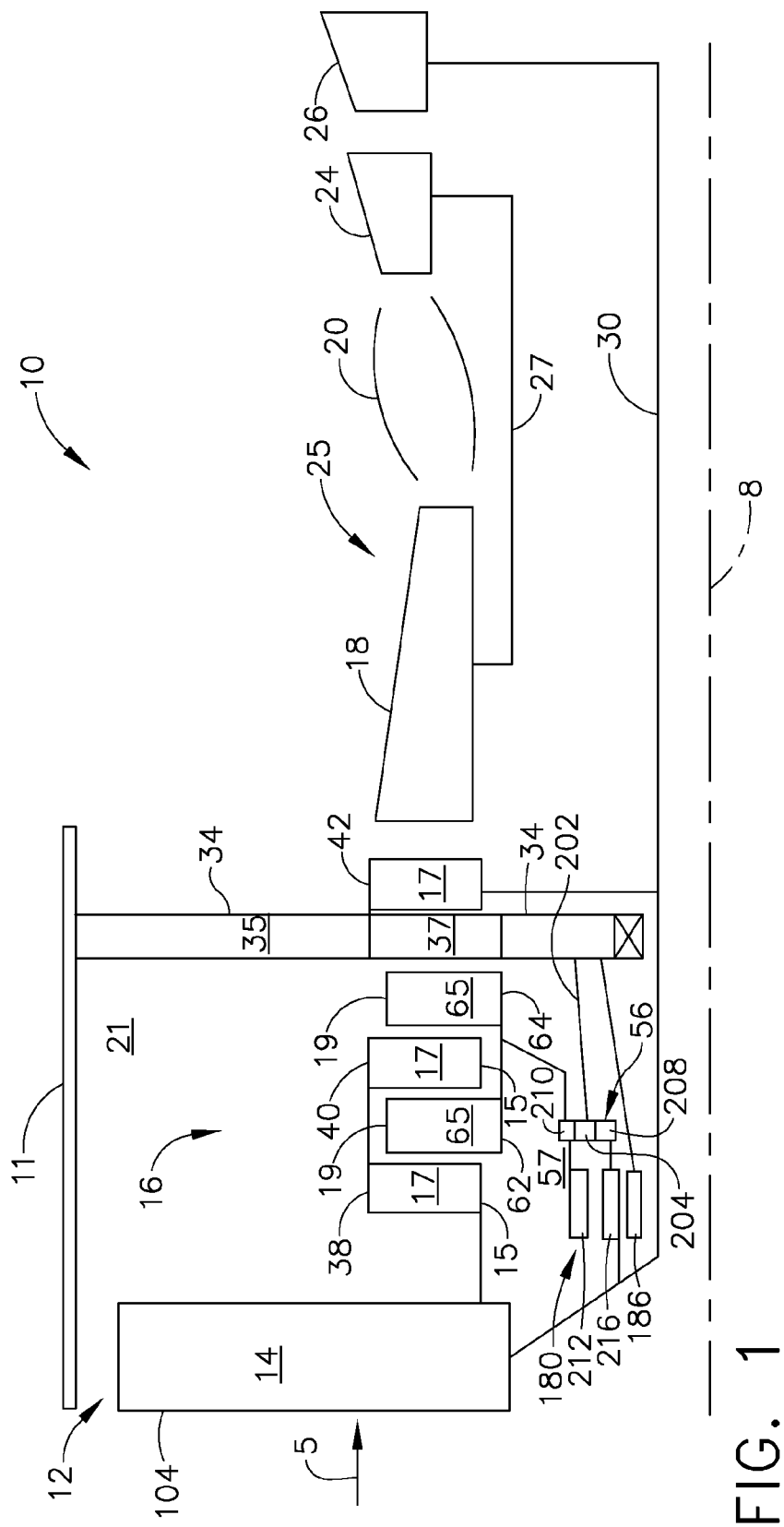
FIG. 1 is a longitudinal sectional view diagrammatical illustration of an exemplary embodiment of a counter-rotatable electrical generator disposed in an aircraft turbofan gas turbine engine with counter-rotatable booster stages.
Figure 2:
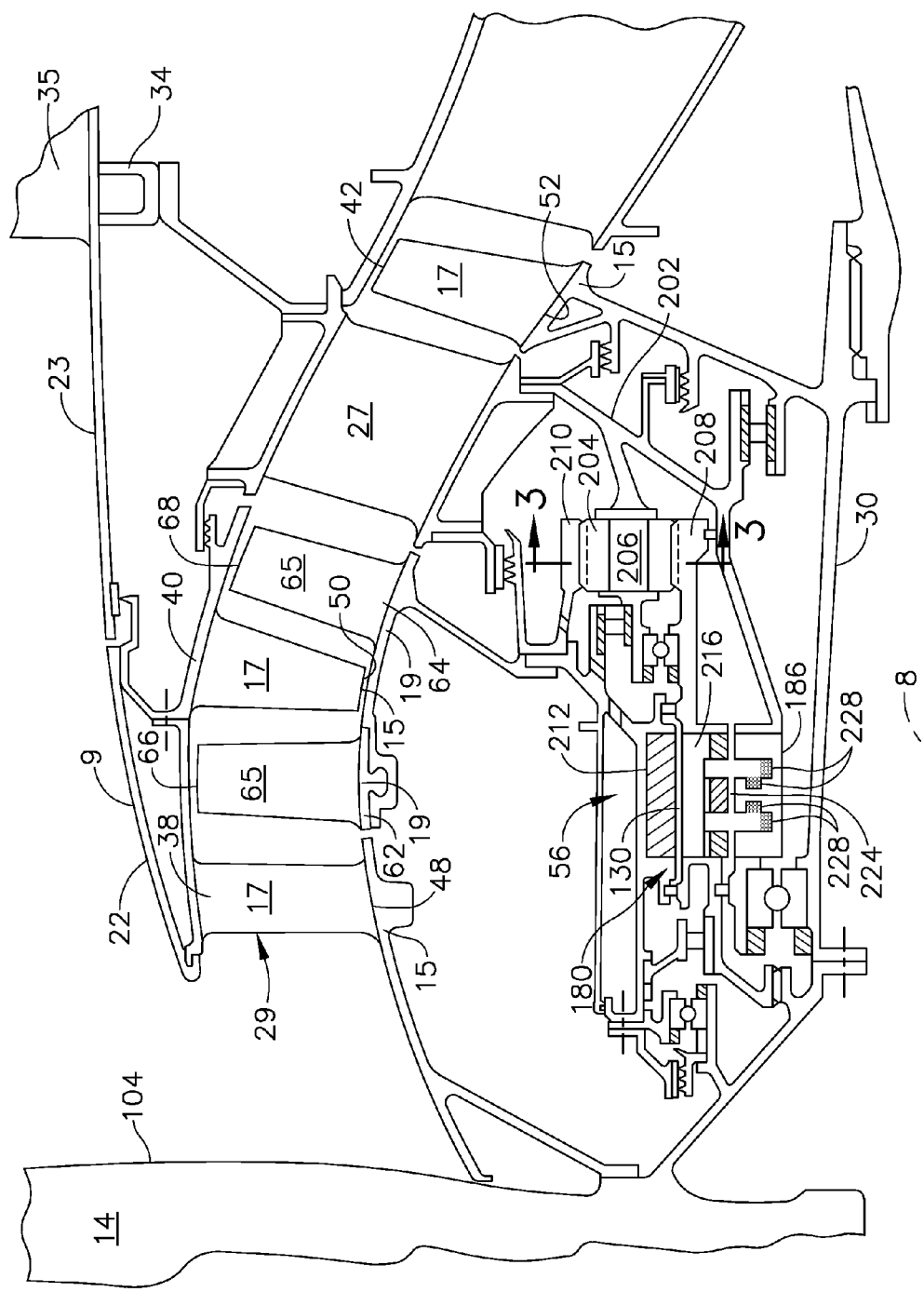
FIG. 2 is an enlarged more detailed longitudinal sectional view illustration of the counter-rotatable electrical generator illustrated in FIG. 1.

Diagrammatically illustrated in FIGS. 1 and 2 is an exemplary turbofan gas turbine engine 10 circumscribed about an engine centerline 8 and having a fan section 12 which receives inlet airflow of ambient air 5. The fan section 12 includes a single fan stage 104 of fan blades 14. Downstream of the fan section 12 is a counter-rotatable booster 16 with counter-rotatable first and second sets of booster stages 15, 19. The first set of booster stages 15 includes first, third, and fifth booster stages 38, 40, 42 of rotatable booster blades 17. The second set of booster stages 19 includes counter-rotatable second and fourth booster stages 62, 64 with counter-rotatable booster blades 65. One of the first and second sets of booster stages 15, 19 is rotatable in a clockwise direction about the engine centerline 8 and another of the first and second sets of booster stages 15, 19 is rotatable in a counter-clockwise direction about the engine centerline 8. Thus, the first and second sets of booster stages 15, 19 may be described as being counter-rotatable with respect to each other.

The first, third, and fifth booster stages 38, 40, 42 have first, third, and fifth booster blade rows 48, 50, 52, respectively. The second and fourth booster stages 62, 64 have second and fourth booster blade rows 66, 68, respectively. The first and third booster blade rows 48, 50 are interdigitated with the second and fourth booster blade rows 66, 68.

Referring to FIG. 1, following the fan section 12 is a high pressure compressor (HPC) 18, a combustor 20 which mixes fuel with the air 5 pressurized by the HPC 18 for generating combustion gases which flow downstream through a high pressure turbine (HPT) 24, and a low pressure turbine (LPT) 26 from which the combustion gases are discharged from the engine 10. A high pressure shaft 27 joins the HPT 24 to the HPC 18. The high pressure compressor 18, combustor 20, and high pressure turbine 24 collectively are referred to as a core engine 25 which includes, for the purposes of this patent, the high pressure shaft 27.

Referring to FIGS. 1 and 2, the single fan stage 104 is drivenly connected to the low pressure turbine 26 by a low pressure shaft 30. The first set of booster stages 15 is also drivenly connected to the low pressure shaft 30. The second set of booster stages 19 is drivenly connected through a differentially geared gearbox 56 to the low pressure shaft 30 so as to be counter-rotatable with respect to the fan stage 104. The gearbox 56 is disposed within a booster cavity 57 of the engine located radially inwardly of the counter-rotatable first and second sets of booster stages 15, 19 of the counter-rotatable booster 16.

Figure 3:
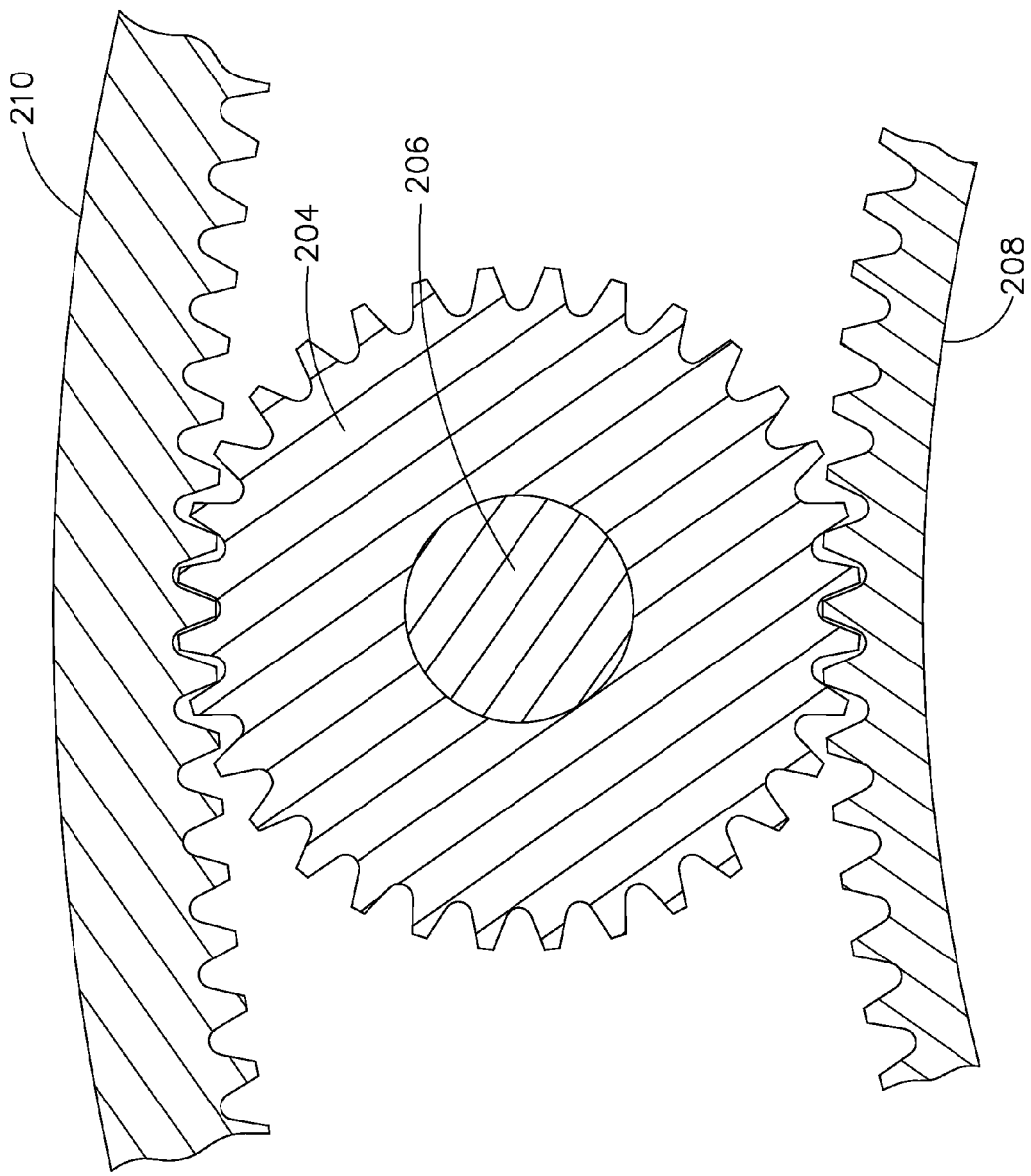
FIG. 3 is an axial view diagrammatical illustration of a differential gearbox through which the counter-rotatable electrical generator is driven as taken through 3-3 in FIG. 2.

The gearbox 56, as further illustrated in FIG. 3, includes an annular carrier 202 supported by a fan frame 34 and planetary gears 204 rotatably mounted on pins 206 cantilevered off the annular carrier 202. A sun gear 208 is meshed with and rotatably mounted radially inwardly of the planetary gears 204 and a ring gear 210 is meshed with and rotatably mounted radially outwardly of the planetary gears 204. The sun gear 208 is drivenly connected to the low pressure turbine 26 by the low pressure shaft 30. The sun gear 208 is operable to drive the planetary gears 204 which, in turn, are operable to drive the ring gear 210 counter-rotatably with respect to the sun gear 208. The second set of booster stages 19 are connected to the ring gear 210 so as to be counter-rotatable with respect to the fan stage 104 and the first set of booster stages 15.

Illustrated in FIGS. 1 and 2 is a counter-rotatable generator 180 disposed within the booster cavity 57. The counter-rotatable generator 180 has an axis of rotation coinciding with the engine centerline 8 about which a generator stator 186 is disposed. The generator stator 186 is mounted to and supported by the fan frame 34. A radially inner pole rotor 216 encircles the generator stator 186 and a radially outer magnet rotor 212 encircles the radially inner pole rotor 216 to counter-rotate during the engine's operation. The radially outer magnet rotor 212 is counter-rotatable with respect to the radially inner pole rotor 216. The pole rotor 216 is drivenly connected to the low pressure turbine 26 by the low pressure shaft 30 and, thus, is co-rotatable with the fan stage 104 and the first set of booster stages 15. The magnet rotor 212 is drivenly connected to the ring gear 210 and, thus, is counter-rotatable with respect to the pole rotor 216 and co-rotatable with the second set of booster stages 19. A generator stator 186 is mounted to and supported by the fan frame 34. The radially outer magnet rotor 212 and the radially inner pole rotor 216 and the generator stator 186 are concentric about a centerline which coincides with the engine centerline 8 as illustrated herein.

Furthermore, in the exemplary embodiment of the counter-rotatable generator 180 illustrated herein, the radially outer magnet rotor 212 and the radially inner pole rotor 216 and the generator stator 186 are axially co-extensive. The counter-rotatable generator 180 includes a rotor air gap 130 between the magnet and pole rotors 212, 216 and a transformer air gap 224 between the pole rotor 216 and the stator 186. Patent Application 230317-2, entitled "COUNTER-ROTATABLE GENERATOR", filed Jun. 15, 2009, assigned to the present assignee discloses a counter-rotatable generator and is incorporated herein by reference.

Figure 4:
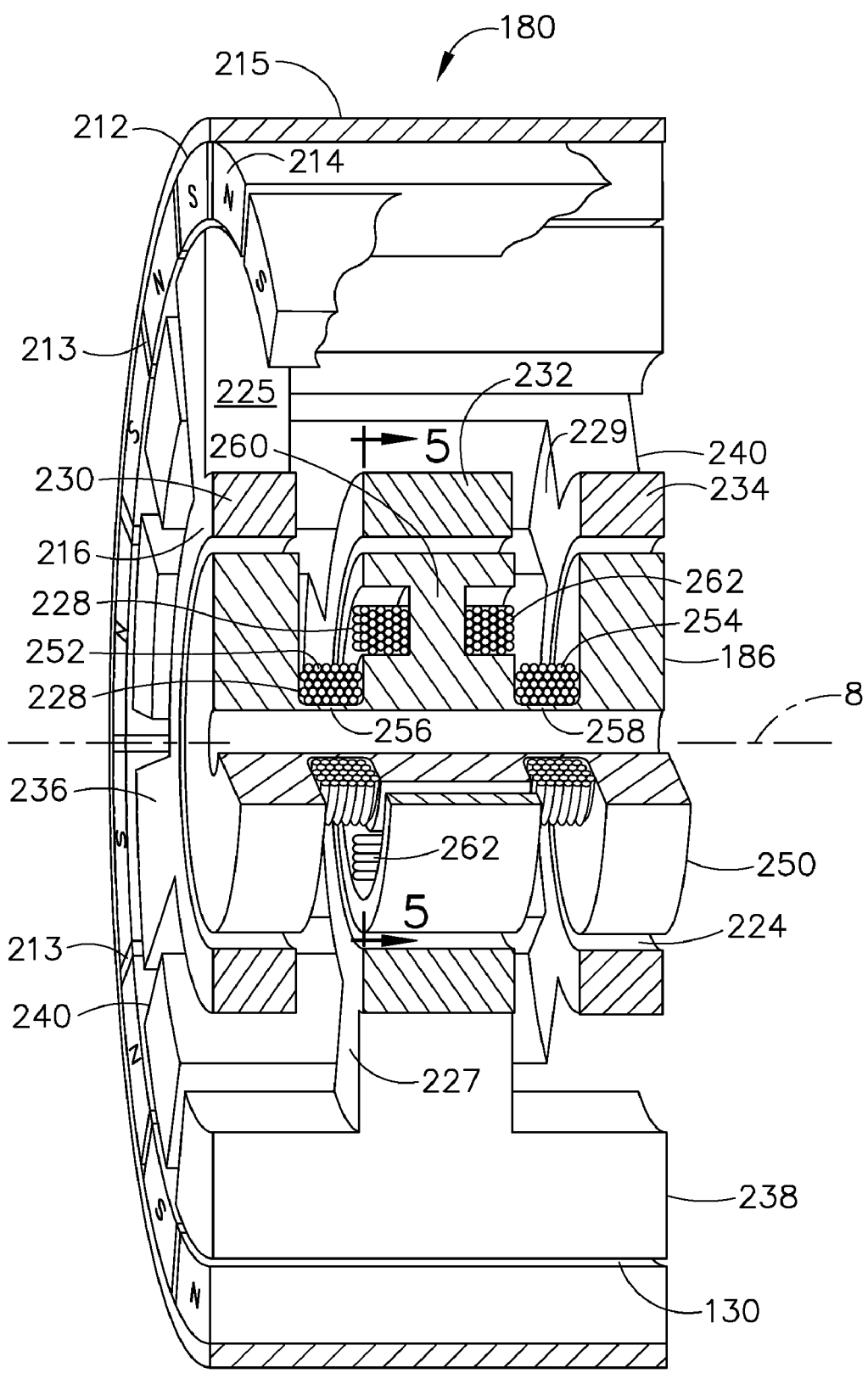
FIG. 4 is a partially cutaway perspective view illustration of the counter-rotatable electrical generator illustrated in FIG. 2.
Figure 5:
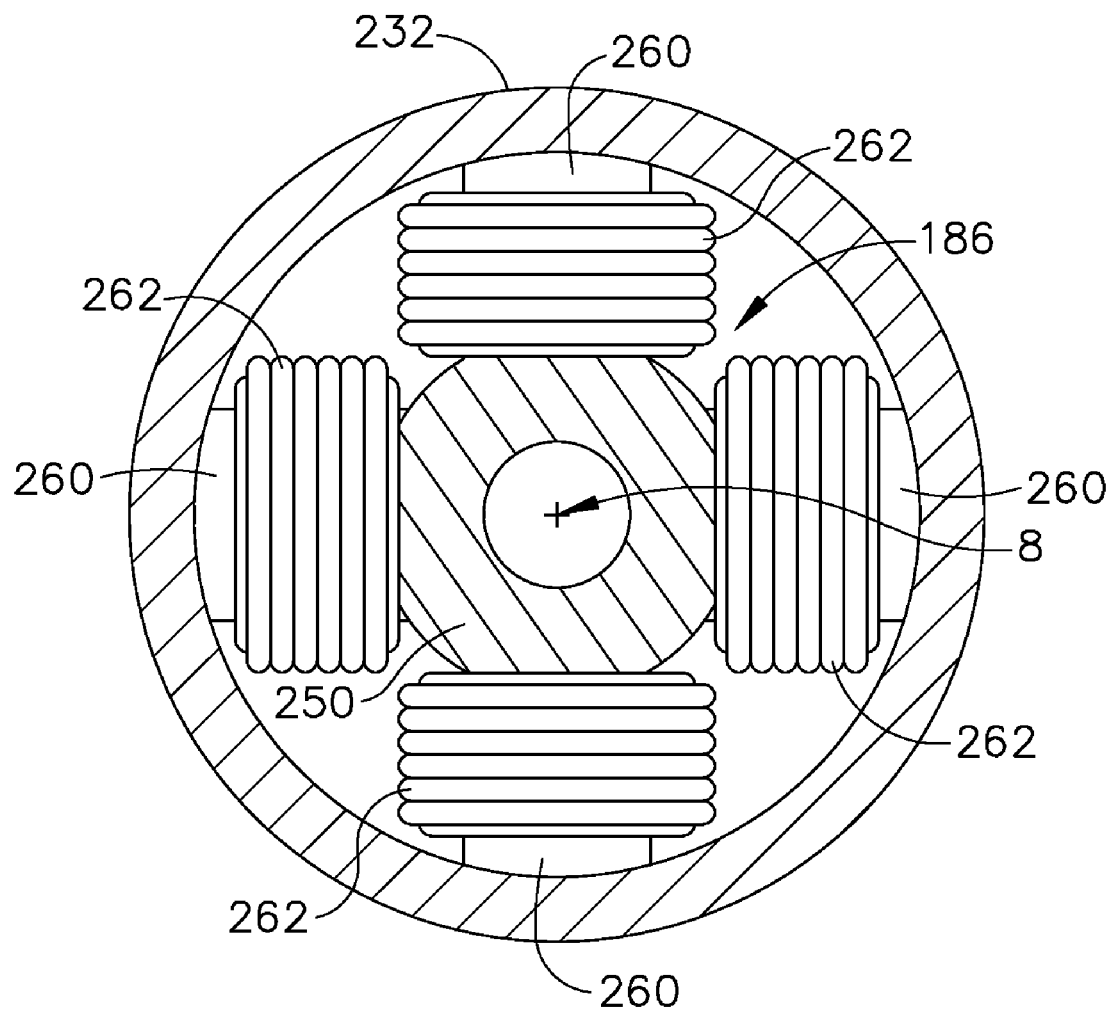
FIG. 5 is an elevational view illustration of stationary radial windings of a stator of the counter-rotatable electrical generator taken through 5-5 in FIG. 4.
Figure 6:
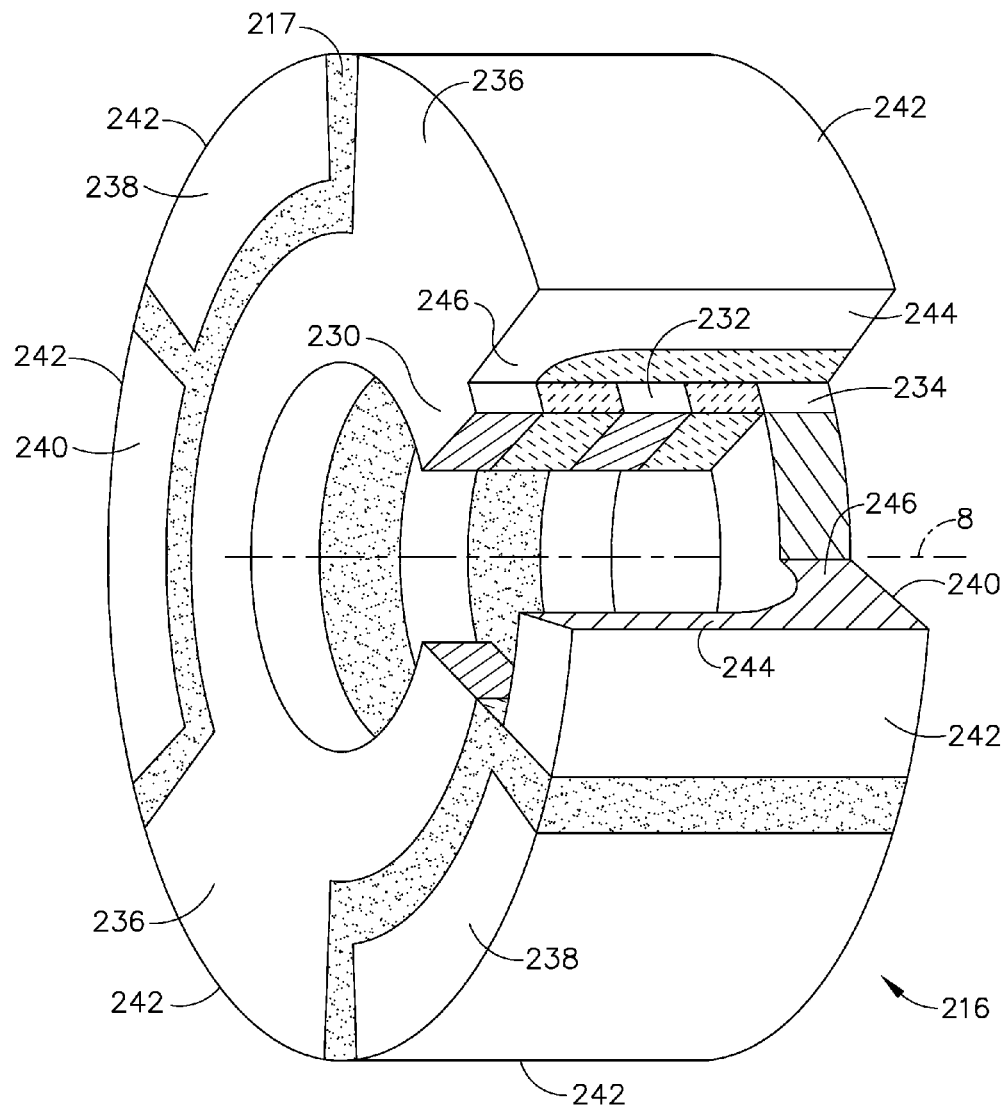
FIG. 6 is a perspective view diagrammatical illustration of the pole rotor of the counter-rotatable electrical generator illustrated in FIG. 4.
Figure 8:
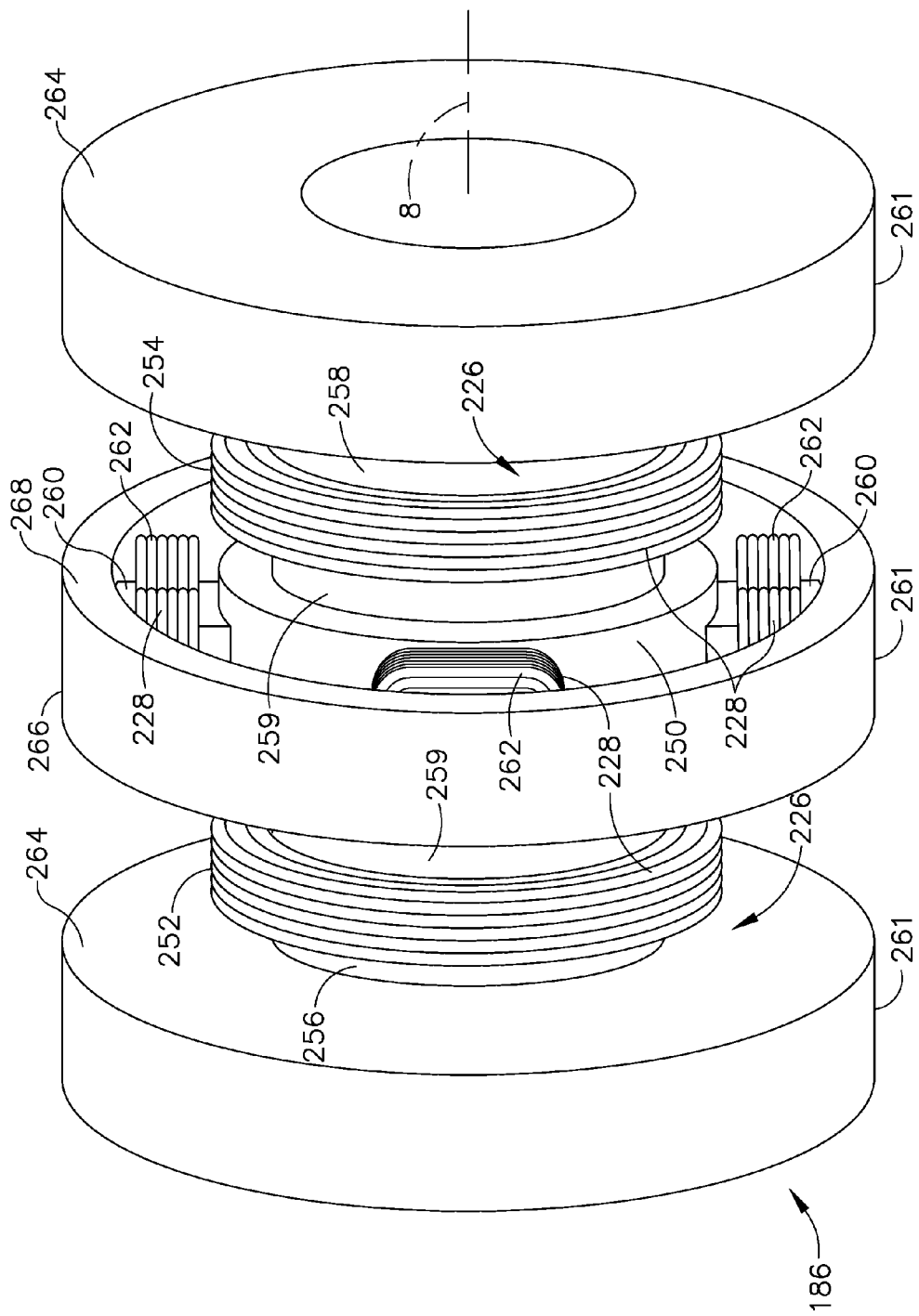
FIG. 8 is a perspective view illustration of the stator of the counter-rotatable electrical generator illustrated in FIG. 4.

The counter-rotatable generator 180 illustrated in greater detail in FIGS. 4 and 5 is a 3 phase, 12 pole counter-rotating permanent magnet generator (PMG) for which the windings can be connected in either a Y or delta arrangement. The counter-rotatable generator 180 illustrated in FIGS. 6 and 8 is a 3 phase, 6 pole counter-rotating permanent magnet generator (PMG) shown for simplicity in explaining the counter-rotatable generator 180. Referring to FIG. 4, the counter-rotatable generator 180 is a permanent magnet generator (PMG) including a stator 186, a pole rotor 216, and a magnet rotor 212. The magnet rotor 212 includes a circular array of magnets 214 with circumferentially alternating north/south and south/north orientations N, S. The magnets 214 are radially retained within a magnet retention ring 215. The magnets 214 are circumferentially separated from each other by non-magnetic material spacers 213.

Figure 7:
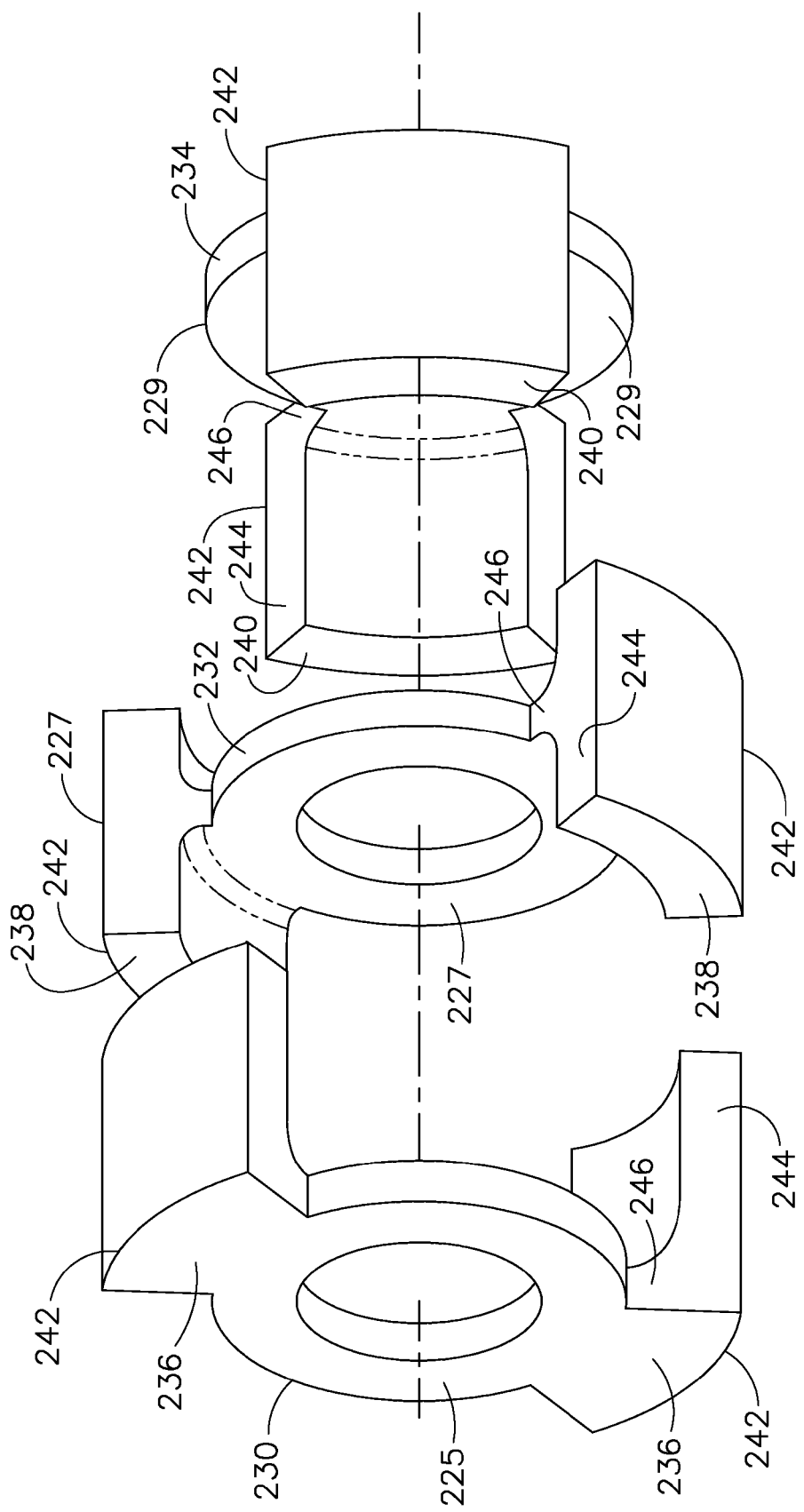
FIG. 7 is an exploded perspective view diagrammatical illustration of the pole rotor illustrated in FIG. 6.

Referring to FIGS. 4, 6, and 7, the pole rotor 216 includes first, second, and third pole assemblies 225, 227, 229 having first, second, and third pole hubs 230, 232, 234 supporting corresponding first, second, and third sets 236, 238, 240 of axially extending rotatable bar poles 242. Each of the bar poles 242 includes an axially extending outer bar 244 connected by a radially extending connector 246 to a respective one of the first, second, and third pole hubs 230, 232, 234. The connector 246 extends radially outwardly from the respective one of the first, second, and third pole hubs 230, 232, 234 to the outer bar 244. The three pole assemblies provide the generator with its three phase operation or generation.

Non-magnetic material 217, which may be in the form of an arbor 219, is disposed axially and radially between the first, second, and third pole assemblies 225, 227, 229. The non-magnetic material 217 is illustrated as transparent hatching and helps provide a solid cylindrically annular shape to the pole rotor 216. The non-magnetic material 217 is not illustrated in FIGS. 4 and 7 for the purpose of clarity.

The pole rotor 216 illustrated in FIGS. 4, 6 and 7 has three hubs, and twelve poles with each pole having one bar and one connector. Alternative embodiments of the pole rotor 216 can include a different number of hubs and a different number of poles on each hub. The hub and pole combination may be made of a magnetic steel and may be homogeneous or laminated. The laminations may be axially stacked along the engine centerline 8. Another possible orientation for the laminations is for hub and bar sections of the laminations to be axially stacked along the centerline 8 and connector sections to be generally circumferentially stacked between the hub and bar sections and the connectors.

Referring to FIGS. 4, 5, and 8, the stator 186 includes a stator cylindrical shaft or annular hub 272 having stationary windings 228 on axially adjacent radial and axial poles 266 and 226. The stationary windings 228 illustrated in these FIGS. are first and second axial windings 252, 254 and radial windings 262. The stator radial pole 266 is illustrated in FIGS. 4, 5, and 8, as a generally cylindrical or annular pole hub 250 and is centered on the stator cylindrical shaft or annular hub 272 and circumscribed about the centerline 8. The stationary first and second axial windings 252, 254 are wound around axial cores 259 of first and second axial poles 256, 258, respectively that are evenly distributed or equidistantly spaced on the shaft or hub 272. The first and second axial poles 256, 258 further include annular or cylindrical stator pole ends 264 continuous or integral with the axial cores 259.

The stator radial pole 266 includes stationary radial cores 260 extending radially outwardly from the pole hub 250 and are axially centered between the first and second axial windings 252, 254. The radial windings 262 are wound around the radial cores 260. The radial cores 260 are equi-angularly spaced about the pole hub 250 and support a pole rim 268 circumscribed around the radial cores 260.

Stator poles 261 include the stator radial pole 266 and first and second axial poles 256, 258, and the stator poles 261 are equi-distantly spaced on the shaft or hub 272 of the stator 186. The stator pole ends 264 are located at opposite ends of the shaft or hub 272 and the stator radial pole 266 is positioned equidistantly between the stationary stator pole ends 264. The exemplary embodiment of the stator 186 illustrated in FIGS. 4-6 has four radial cores 260. Other embodiments of the counter-rotatable generator 180 may have more or less radial cores, axial poles, and/or magnets 214.

The magnet and pole rotors 212, 216 are counter-rotatable with respect to each other. The magnet rotor 212 is driven in one rotational direction (clockwise or counter-clockwise) and provides a rotating flux field just as it would in a conventional alternator. The pole rotor 216 is driven in another rotational direction (clockwise or counter-clockwise). At any given circumferential position, the flux field alternates between a N-S and S-N polarity with an approximately sinusoidal magnitude. The stationary windings 228 are stationary with respect to the counter-rotatable magnet and pole rotors 212, 216 and are illustrated herein as supported by the fan frame 34 in FIGS. 1 and 2.

The magnet rotor in a conventional PMG is positioned either inside or outside a fixed coaxial stator, which has poles that conduct the alternating magnetic field through electrical windings on the poles. The alternating magnetic field in the windings induce an electrical field in the windings, thus, generating electrical potential to provide to an external electrical system. For a given geometry and magnet design, the generated voltage is proportional to the frequency at which the field oscillates, that is the speed at which the magnet rotor spins.

The counter-rotatable generator 180 increases the apparent speed of the generator by spinning the rotor in one direction and what is conventionally referred to as the "stator" in another direction. To avoid the need for slip rings to conduct current from the rotating "stator" to the stationary part of the system, a rotating transformer concept is employed whereby the poles are rotated on the pole rotor 216 and the windings 228 are on the stator 186, a stationary part of the engine 10, mounted to and supported by the fan frame 34. In the rotating transformer, the flux is conveyed across featureless ring-shaped air-gaps axially separated. A conventional magnet-bearing rotor has to observe the same speed and diameter limits as in the conventional machine, but the pole rotor (defined herein as a rotor), having simple magnetic alloy shapes (much like the rotor of a homopolar or induction generator) with no windings or magnets, can be rotated at a higher speed. The counter-rotatable generator 180 includes a rotor air gap 130 between the magnet and pole rotors 212, 216 and the transformer air gap 224 between the pole rotor 216 and the stator 186.

The counter-rotatable generator 180 may be used in various other gas turbine engine installations as well as other installations. The counter-rotatable generator 180 may be driven, along with counter-rotatable fans, by counter-rotatable low pressure turbines. The counter-rotatable generator 180 may be driven by counter-rotatable high pressure turbines as well. The counter-rotatable generator 180 may be disposed within the engine in a cavity other than a booster cavity 57 such as in a tail cone or centerbody cavity. Patent Application 230317-1, entitled "AIRCRAFT GAS TURBINE ENGINE COUNTER-ROTATABLE GENERATOR", filed Jun. 15, 2009, assigned to the present assignee, discloses some other exemplary installations of the counter-rotatable generator 180 and is incorporated herein by reference.

Referring to FIGS. 1 and 2, a bypass duct 21 radially bounded by a fan casing 11 and a rotatable annular radially inner bypass duct wall 9 surrounds the booster 16 and a core engine inlet duct 29 to the high pressure compressor 18 of the core engine 25. The fan casing 11 is fixedly connected to the fan frame 34 by fan frame struts 35. A plurality of booster struts 37, radially inwardly supported by the fan frame 34, are disposed in the core engine inlet duct 29 between the fourth booster stage 64 and the fifth booster stage 42. The bypass duct 21 is radially outwardly bounded by the annular fan casing 11 and radially inwardly bounded by an annular radially inner bypass duct wall 9 illustrated in FIG. 2. The radially inner bypass duct wall 9 includes a rotatable wall section 22 fixedly mounted to the first booster blade row 48 of the first booster stage 38. The radially inner bypass duct wall 9 also includes a fixed or non-rotatable wall section 23 fixedly mounted to the fan frame 34.

Figure 10:
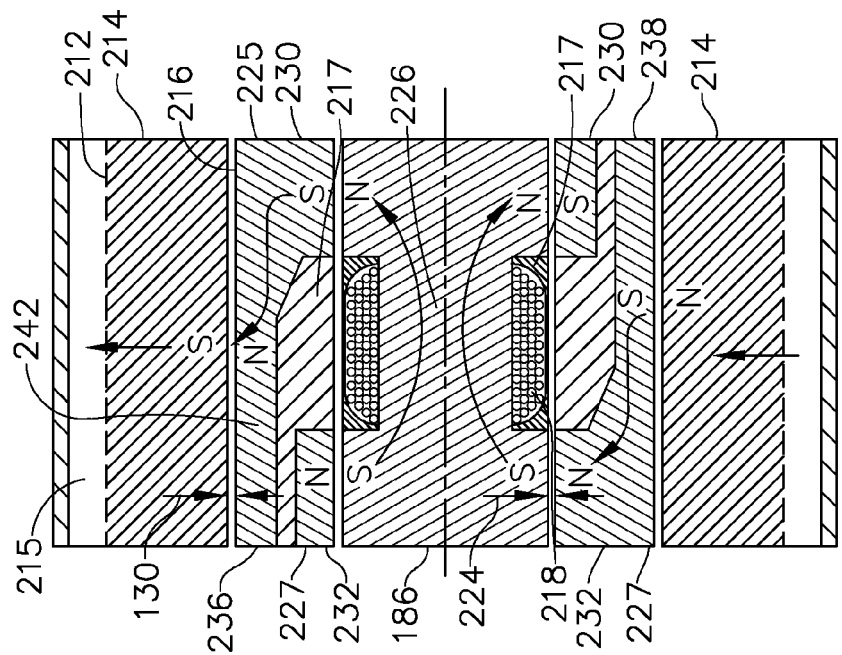
FIG. 10 is an axial sectional view diagrammatical illustration of the counter-rotatable electrical generator taken through 10-10 in FIG. 9.
Figure 9:
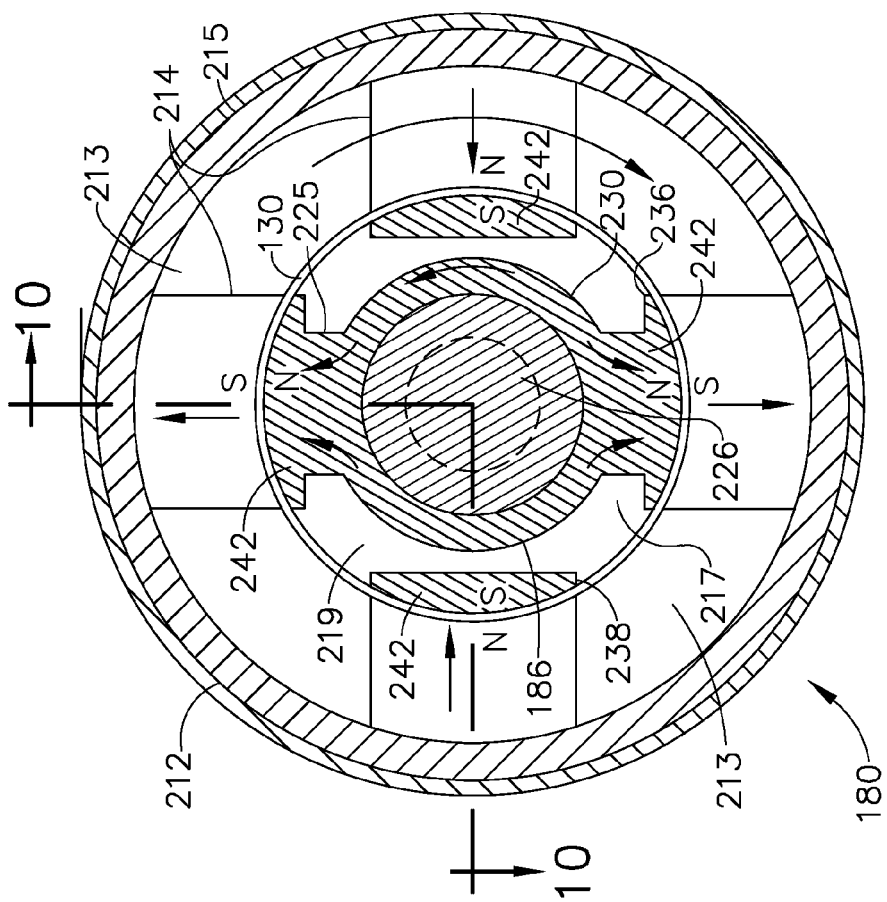
FIG. 9 is a sectional view diagrammatical illustration of an alternative single phase counter-rotatable electrical generator having four PMG magnets.

Illustrated in FIGS. 9 and 10 is a counter-rotatable generator 180, more specifically an alternator, having a single-phase 4-pole design though many other designs are contemplated as illustrated above. The magnet rotor 212 has 4 magnets 214 that are radially retained within a magnet retention ring 215 and circumferentially separated from each other by non-magnetic material spacers 213. The pole rotor 216 has first and second pole assemblies 225, 227 having first and second pole hubs 230, 232 supporting corresponding first and second sets 236, 238 of axially extending rotatable bar poles 242. Two bar poles 242 extend radially outwardly from each of the first and second pole hubs 230, 232. The bar poles 242 are separated and radially supported by a non-magnetic material 217 illustrated as an arbor 219 herein. The generator's stator 186 has 1 axial pole 226 supporting 1 axial winding 218 and is distributed in a balanced fashion. The pole rotor 216 and the stator 186 cooperate to function as a transformer. The windings 218 are held in place on the axial poles 226 with a non-magnetic material 217 such as an epoxy.

As the outer magnet rotor 212 turns relative to the inner pole rotor 216, sinusoidally varying magnetic flux is conveyed to the stator 186 across the transformer air gaps 224 which induces a single phase sinusoidal voltage in the stator winding illustrated in FIGS. 9 and 10 as a single axial winding 218. The magnitude of the voltage and the frequency are both proportional to rotor speed. The magnitude of the voltage is also affected by the size of a transformer air gap 224 between the pole rotor 216 and the stator 186. As a general rule, the smaller the transformer air gap the greater the magnetic field strength created in the stator 186.

The counter-rotatable generator 180 increases the apparent speed of the generator by spinning the rotor in one direction and what is conventionally referred to as the "stator" in another direction. To avoid the need for slip rings to conduct current from the rotating "stator" to the stationary part of the system, a rotating transformer concept is employed whereby the poles are rotated on the pole rotor 216 and the winding 218 is mounted on the generator stator 186 which is non-rotatable with respect to the magnet and pole rotors 212, 216.

In the rotating transformer, the flux is conveyed across featureless axially separated ring-shaped air-gaps. A conventional magnet-bearing rotor has to observe the same speed & diameter limits as in the conventional machine, but the pole rotor, having simple magnetic alloy shapes (much like the rotor of a homopolar or induction generator) with no windings or magnets, can be rotated at a higher speed. The counter-rotatable generator 180 includes a rotor air gap 130 between the magnet and pole rotors 212, 216 and the transformer air gap 224 between the pole rotor 216 and the stator 186.

Figure 11:
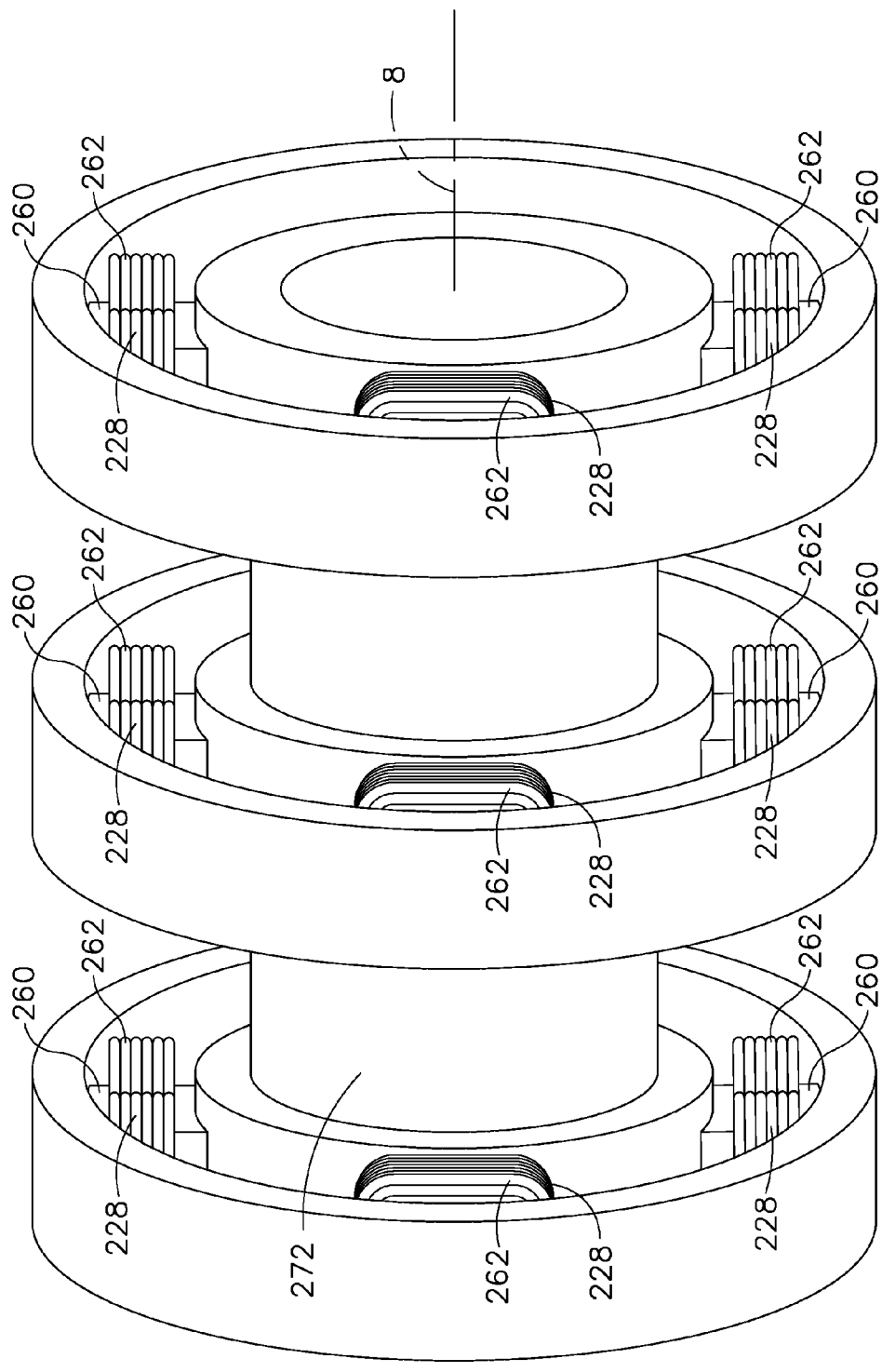
FIG. 11 is a perspective view illustration of an alternative stator for the counter-rotatable electrical generator illustrated in FIG. 4.

One alternative stator 270, illustrated in FIG. 11, has no axial windings. The alternative stator 270 has three sets (other numbers of sets may be used) of stationary radial cores 260 extending radially outwardly from a stator cylindrical shaft or annular hub 272. The sets are evenly distributed or equidistantly spaced on the shaft or hub 272. Radial windings 262 are wound around the radial cores 260. The radial cores 260 are equi-angularly spaced about the hub 272.

Figure 13:
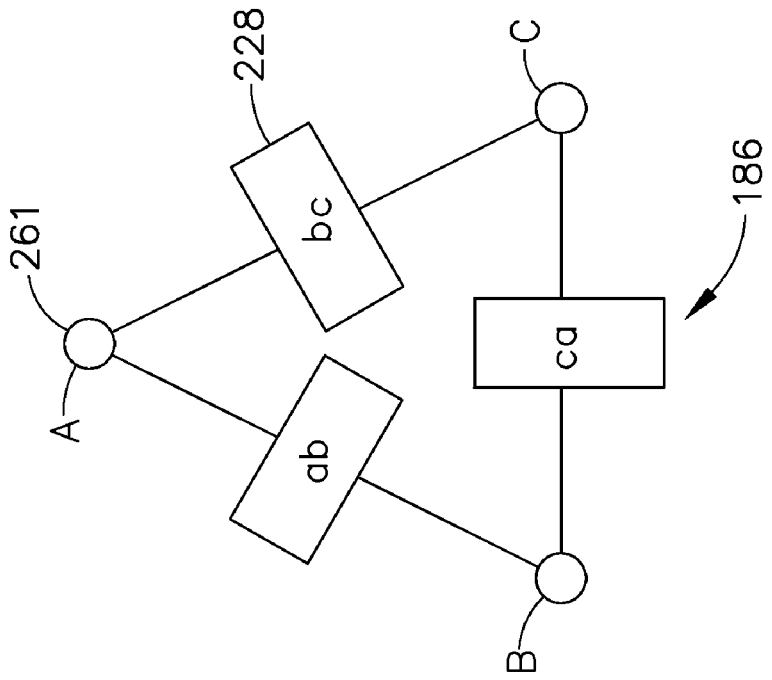
FIG. 13 is a schematical view illustration of a three phase Delta-connected stator for a counter-rotatable electrical generator.
Figure 12:
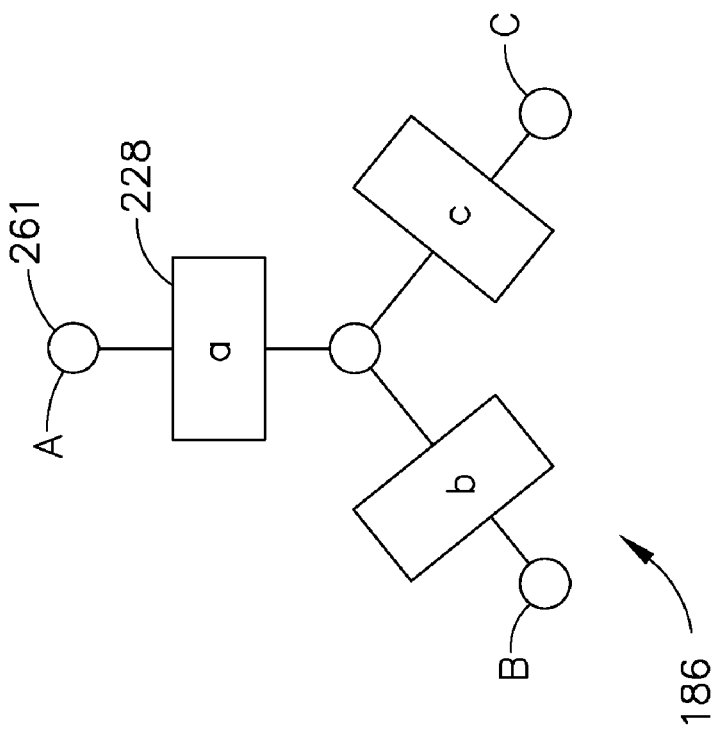
FIG. 12 is a schematical view illustration of a three phase Y-connected stator for a counter-rotatable electrical generator.

FIG. 12 schematically illustrates a three phase Y-connected stator for a counter-rotatable electrical generator having three stator annular poles 261 labelled A, B, and C and three Y-connected stationary windings 228 labelled a, b, and c. FIG. 13 schematically illustrates a three phase Delta-connected stator for a counter-rotatable electrical generator having three stator annular poles 261 labelled A, B, and C and three Delta-connected stationary windings 228 labelled ab, bc, and ca. FIGS. 12 and 13 illustrate how the stator 186 may have either Y-connected or Delta-connected stationary windings 228.

Figure 14:
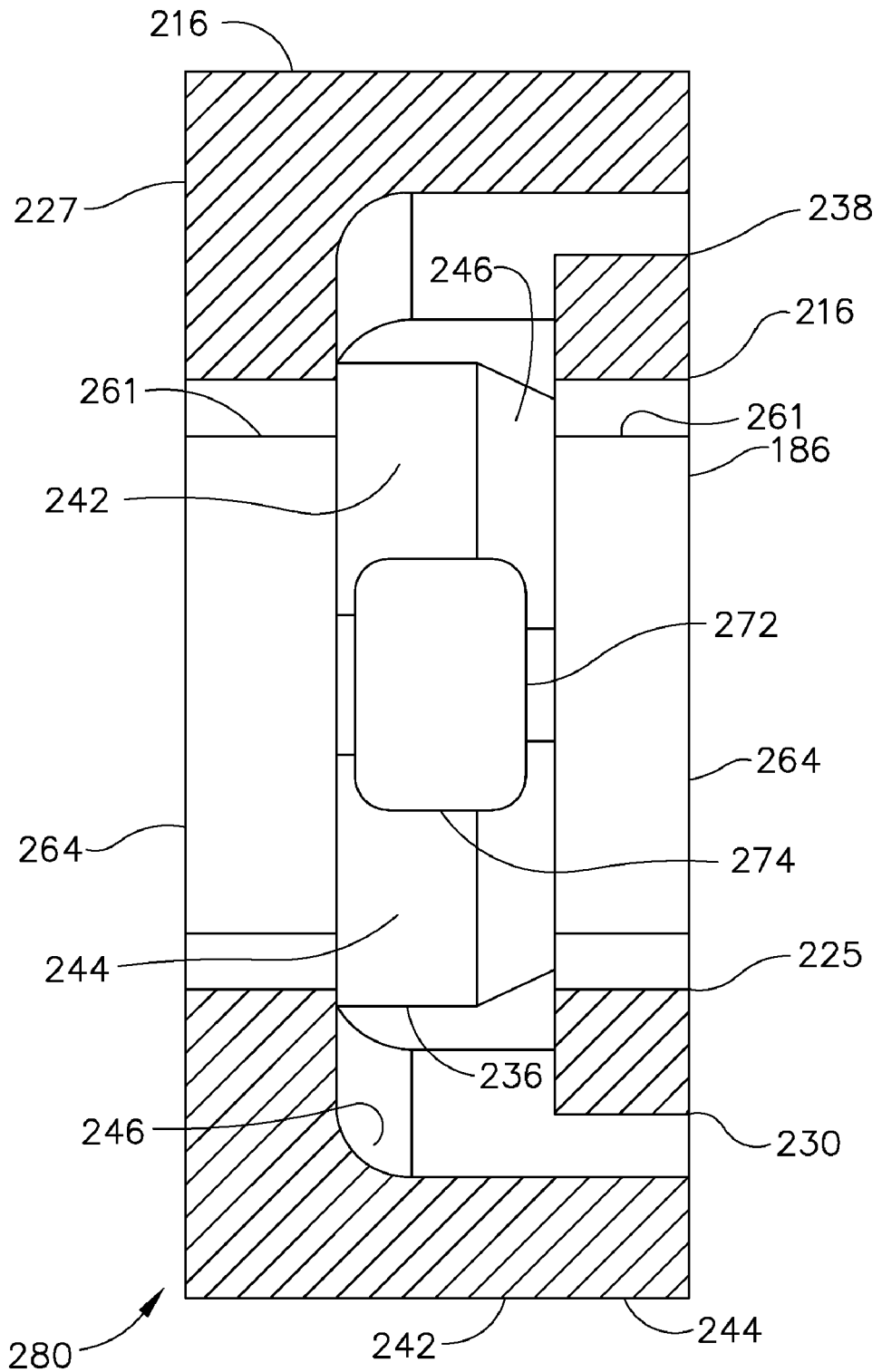
FIG. 14 is an axial sectional view diagrammatical illustration of a counter-rotatable electrical alternator with a single phase stator having a single axial winding.

FIG. 14 diagrammatically illustrates a portion of a counter-rotatable electrical alternator 280 having a single phase stator 186 with a single axial winding 274 between two stator pole ends 264 located at opposite ends of the shaft or hub 272. The pole rotor 216 includes first and second pole assemblies 225, 227, having first and second pole hubs 230, 232, supporting corresponding first and second sets 236, 238, of axially extending rotatable bar poles 242. Each of the bar poles 242 includes an axially extending outer bar 244 connected by a radially extending connector 246 to a respective one of the first and second pole hubs 230, 232.

Figure 15:
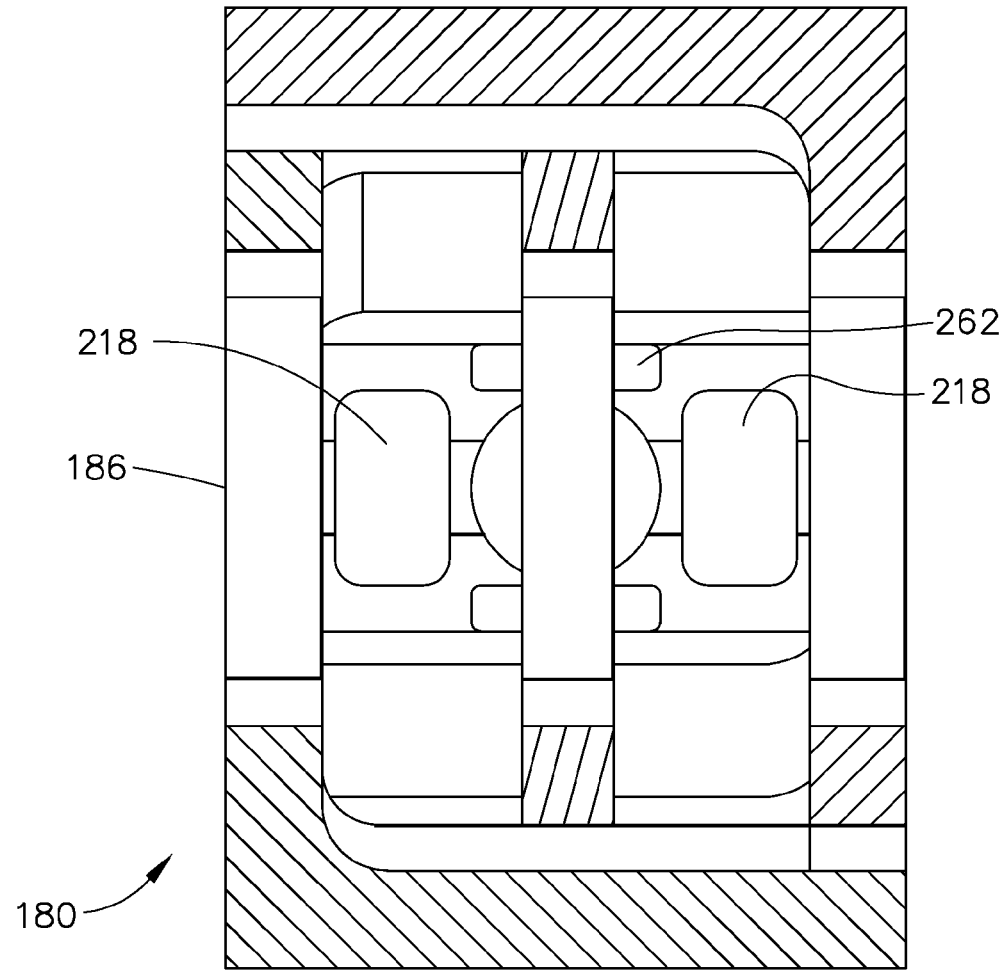
FIG. 15 is an axial sectional view diagrammatical illustration of a counter-rotatable electrical generator with three phase Y-connected axial and radial stator windings.
Figure 16:
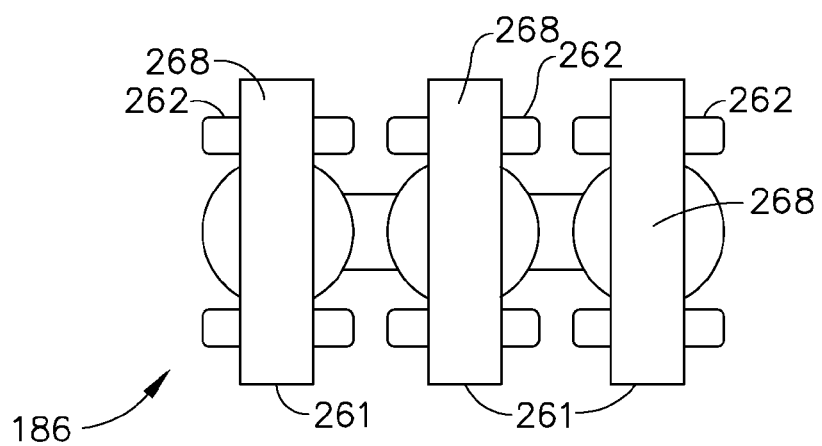
FIG. 16 is an axial sectional view diagrammatical illustration of a three phase Y-connected stator with all radial stator windings for the generator illustrated in FIG. 15.

FIG. 15 diagrammatically illustrates a counter-rotatable electrical generator 180 with three phase Y-connected axial and radial stator windings 218 and 262 on the stator 186. This configuration is illustrated in more detail in FIGS. 4, 5, and 8 and discussed above. FIG. 16 diagrammatically illustrates a three phase Y-connected stator 186 with three radial stator windings 262 which may be used in the generator 180 illustrated in FIG. 15. Stator annular poles 261 include pole rims 268 circumscribing and supported by radial cores about which the radial stator windings 262 are wound.

Figure 17:
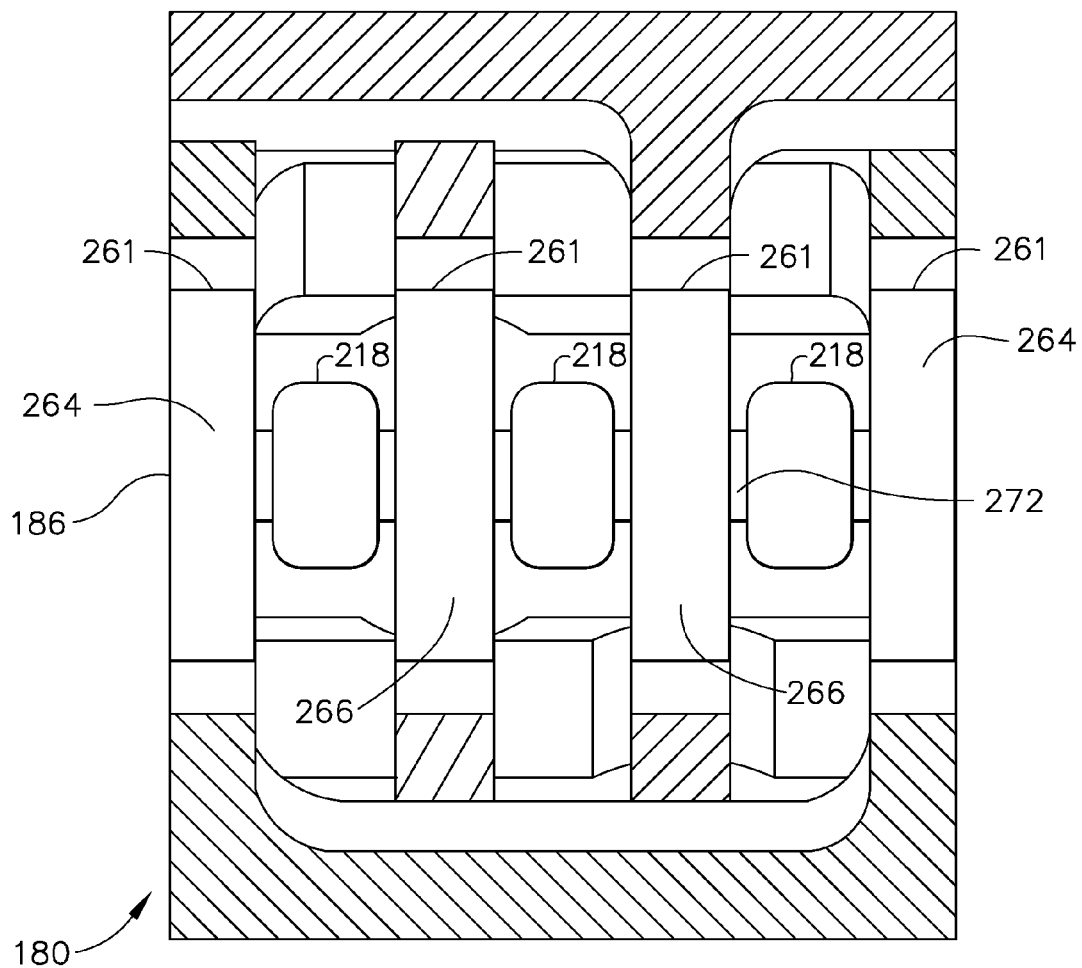
FIG. 17 is an axial sectional view diagrammatical illustration of a counter-rotatable electrical generator with three phase Delta-connected axial stator windings.

FIG. 17 diagrammatically illustrates a counter-rotatable electrical generator 180 with three phase Delta-connected axial stator windings 218 on the stator 186. The stator 186 includes four stator annular poles 261 including two stator pole ends 264 located at opposite ends of the shaft or hub 272 and two stator intermediate poles 266 located equidistantly between the stationary stator pole ends 264.

Figure 18:
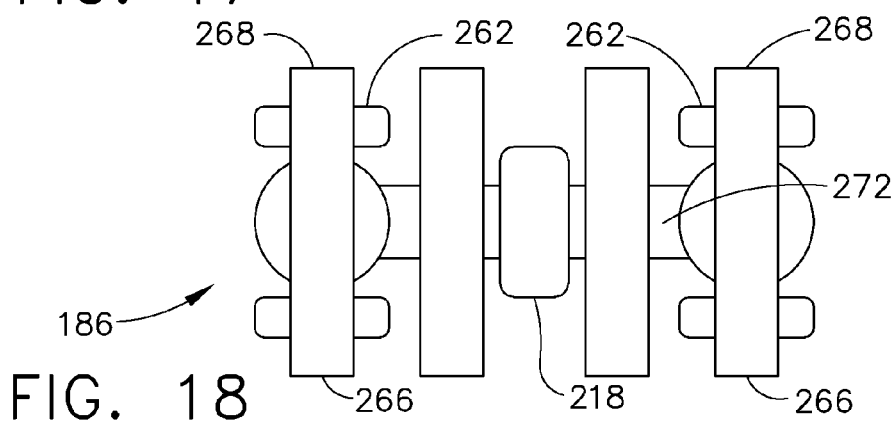
FIG. 18 is an axial sectional view diagrammatical illustration of a three phase Delta-connected stator with axial and radial stator windings for the generator illustrated in FIG. 17.

FIG. 18 diagrammatically illustrates a three phase Delta-connected stator 186 with a single axial stator winding 218 centered between two radial stator windings 262 on the shaft or hub 272 and designed for use in a generator as illustrated in FIG. 17. The single axial stator winding 218 is disposed on the shaft or hub 272 between two stator annular poles 261. Stator end poles 266 include pole rims 268 supported by radial cores about which the radial stator windings 262 are wound.

Figure 19:
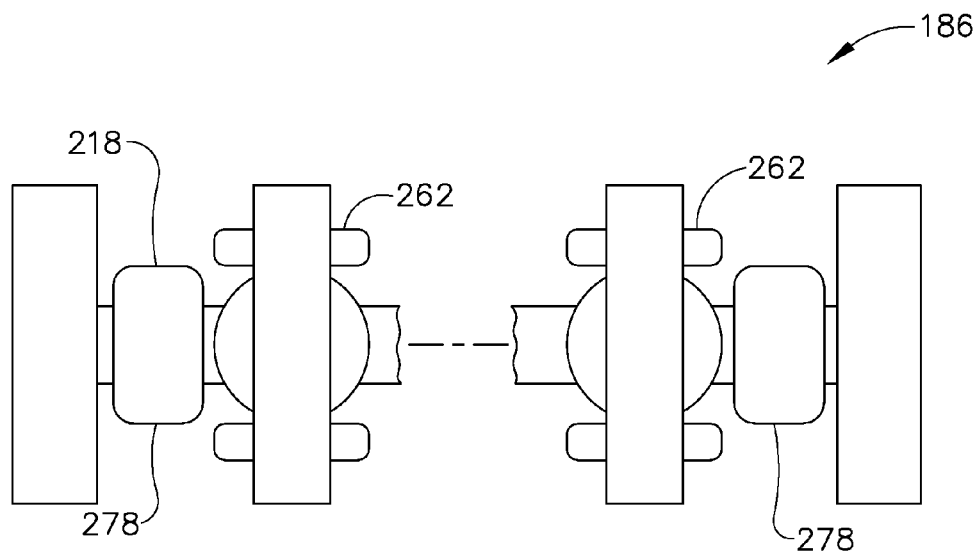
FIG. 19 is an axial sectional view diagrammatical illustration of a multi-phase Y-connected stator with axial and radial stator windings.
Figure 20:
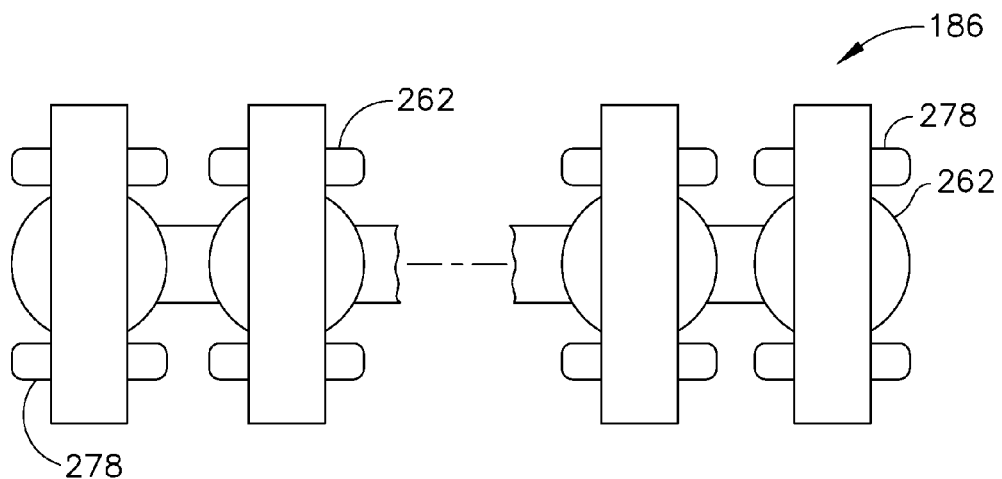
FIG. 20 is an axial sectional view diagrammatical illustration of a multi-phase Y-connected stator with only radial stator windings.

The counter-rotatable electrical generator 180 illustrated herein may be multiphase or N-phase generators with either Y-connected or Delta-connected stators. FIGS. 19-20 conceptually illustrate N-phase stators 186 with either Y-connected or Delta-connected stationary windings 228 that are either the radial stator windings 262 or the axial stator windings 218 or a combination of both the radial stator windings 262 and the axial stator windings 218. Some general rules regarding the configuration of the stators are as follow.

An alternator (illustrated in FIG. 14) is a single phase generator and has only a single axial winding 274 wound around an axial cores 259 between two stator pole ends 264.

For multi-phase stators 180, the two windings at the two ends of the stator can be radial windings 262 or axial windings 218 such as the stator 186 illustrated in FIG. 16 compared to the stator 186 illustrated in FIG. 15.

Y-connected multi-phase stators 180, as illustrated in FIGS. 19 and 20, have N number of phases, N number of stator poles 181, and N number of stator windings, and except for the end windings 278 at opposite ends of the shaft or annular hub 272, the stator windings must be radial windings 262. This is illustrated as the three phase Y-connected stator 186 illustrated in FIGS. 15, 16, 19, and 20. The dashed line 276 illustrated in FIGS. 19 and 20 indicate additional stator windings and stator poles.

Figure 21:
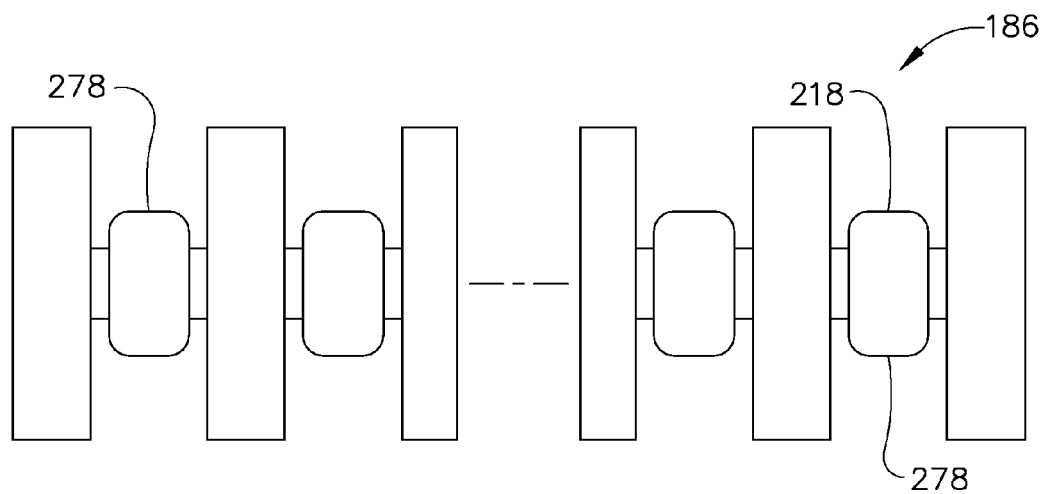
FIG. 21 is an axial sectional view diagrammatical illustration of a multi-phase Delta-connected stator with only axial stator windings.
Figure 22:
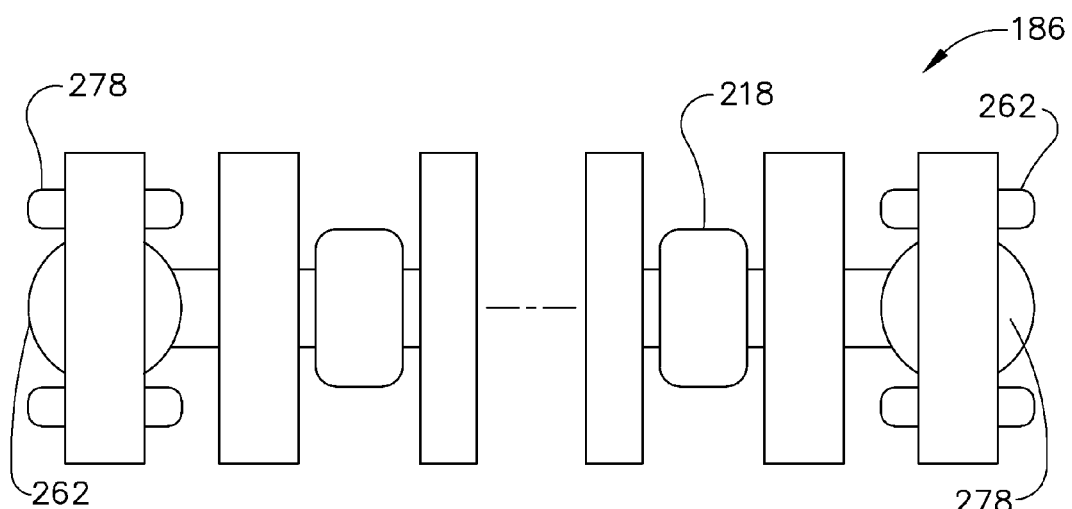
FIG. 22 is an axial sectional view diagrammatical illustration of a multi-phase Delta-connected stator with radial stator windings and only axial stator windings therebetween.

Delta-connected multi-phase stators 180, as illustrated in FIGS. 21 and 22, have N number of phases, N+1 number of stator poles 181 and N number of stator windings, and except for the end windings 278, the windings must be axial windings 218. The dashed line 276 illustrated in FIGS. 20 and 21 indicate additional stator windings and stator poles.

The present invention has been described in an illustrative manner. It is to be understood that the terminology which has been used is intended to be in the nature of words of description rather than of limitation. While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims:

1. A counter-rotatable generator comprising:
   a generator stator,
   counter-rotatable radially inner pole and outer magnet rotors, and
   the radially outer magnet rotor, the radially inner pole rotor, and the generator stator being concentric.

2. A counter-rotatable generator as claimed in claim 1, further comprising:
   the radially outer magnet rotor encircling the radially inner pole rotor,
   the radially inner pole rotor encircling the generator stator,
   a rotor air gap between the magnet and pole rotors, and
   a transformer air gap between the pole rotor and the stator.

3. A counter-rotatable generator as claimed in claim 2, further comprising:
   the magnet rotor including a circular array of magnets having circumferentially alternating north/south and south/north orientations,
   the circular array of magnets retained within a magnet retention ring, and
   the magnets circumferentially separated from each other by non-magnetic material spacers.

4. A counter-rotatable generator as claimed in claim 2, further comprising:
   the pole rotor including one or more pole assemblies having one or more pole hubs supporting one or more sets of axially extending rotatable bar poles respectively,
   each of the bar poles including an axially extending outer bar connected to a respective one of the pole hubs by a connector extends radially outwardly from the respective one of the pole hubs to the outer bar, and
   non-magnetic material disposed axially and radially between the pole assemblies.

5. A counter-rotatable generator as claimed in claim 4, further comprising the non-magnetic material in an arbor disposed axially and radially between the pole assemblies.

6. A counter-rotatable generator as claimed in claim 5, further comprising:
   the magnet rotor including a circular array of magnets having circumferentially alternating north/south and south/north orientations,
   the circular array of magnets retained within a magnet retention ring, and
   the magnets circumferentially separated from each other by non-magnetic material spacers.

7. A counter-rotatable generator as claimed in claim 6, further comprising the pole hubs and the bar poles being made of a magnetic steel.

8. A counter-rotatable generator as claimed in claim 2, further comprising:
   the stator including a stator cylindrical shaft or annular hub with axially adjacent radial and axial poles,
   the axial poles including one or more axial windings wound around axial cores of annular axial poles on the shaft or the annular hub,
   each of the radial poles including radial windings wound around radial cores extending radially outwardly from a cylindrical or annular pole hub on the stator cylindrical shaft or the annular hub, and
   the radial cores equi-angularly spaced about the pole hub.

9. A counter-rotatable generator as claimed in claim 8, further comprising pole rims circumscribing and supported by the radial cores.

10. A counter-rotatable generator as claimed in claim 8, further comprising the non-magnetic material in an arbor disposed axially and radially between the pole assemblies.

11. A counter-rotatable generator as claimed in claim 8, further comprising the magnet rotor including a circular array of magnets having circumferentially alternating north/south and south/north orientations.

12. A counter-rotatable generator as claimed in claim 11, further comprising:
   the magnet rotor including a circular array of magnets having circumferentially alternating north/south and south/north orientations,
   the circular array of magnets retained within a magnet retention ring, and
   the magnets circumferentially separated from each other by non-magnetic material spacers.

13. A counter-rotatable generator as claimed in claim 8, further comprising:
   the stator including a stator cylindrical shaft or annular hub,
   axial windings wound around annular axial poles evenly distributed or equi-distantly spaced on the shaft or the annular hub,
   radial cores extending radially outwardly from a generally cylindrical or annular pole hub axially centered on the stator cylindrical shaft or the annular hub between the first and second axial windings, the radial cores equi-angularly spaced about the pole hub, and radial windings wound around the radial cores.

14. A counter-rotatable generator as claimed in claim 13, further comprising pole rims circumscribing and supported by the radial cores.

15. A counter-rotatable generator as claimed in claim 13, further comprising the non-magnetic material in an arbor disposed axially and radially between the pole assemblies.

16. A counter-rotatable generator as claimed in claim 13, further comprising the magnet rotor including a circular array of magnets having circumferentially alternating north/south and south/north orientations.

17. A counter-rotatable generator as claimed in claim 16, further comprising:
    the magnet rotor including a circular array of magnets having circumferentially alternating north/south and south/north orientations,
    the circular array of magnets retained within a magnet retention ring, and
    the magnets circumferentially separated from each other by non-magnetic material spacers.

18. A counter-rotatable generator as claimed in claim 2, further comprising the counter-rotatable generator being an alternator having a single axial winding between two stator pole ends located at opposite ends of the shaft or hub.

19. A counter-rotatable generator as claimed in claim 18, further comprising:
    the magnet rotor including a circular array of magnets having circumferentially alternating north/south and south/north orientations,
    the circular array of magnets retained within a magnet retention ring, and
    the magnets circumferentially separated from each other by non-magnetic material spacers.

20. A counter-rotatable generator as claimed in claim 19, further comprising the non-magnetic material in an arbor disposed axially and radially between the pole assemblies.

21. A counter-rotatable generator as claimed in claim 20, further comprising the magnet rotor including a circular array of magnets having circumferentially alternating north/south and south/north orientations.

22. A counter-rotatable generator as claimed in claim 2, further comprising:
    the stator including a stator cylindrical shaft or annular hub with axially adjacent stator poles having Delta-connected and/or Y-connected stationary windings.

23. A counter-rotatable generator as claimed in claim 22, further comprising:
    the stator being Y-connected,
    the counter-rotatable generator being multi-phase with an N number of phases,
    the stator cylindrical shaft or annular hub having the same N number of the Y-connected stationary windings, and,
    all the Y-connected stationary windings being radial windings.

24. A counter-rotatable generator as claimed in claim 22, further comprising:
    the stator being Y-connected,
    the counter-rotatable generator being multi-phase with an N number of phases,
    the stator cylindrical shaft or annular hub having the same N number of the Y-connected stationary windings, and
    Y-connected stationary axial end windings at opposite ends of the shaft or annular hub,
    and all the Y-connected stationary windings between the axial end windings being radial windings.

25. A counter-rotatable generator as claimed in claim 22, further comprising:
    the stator being Delta-connected,
    the counter-rotatable generator being multi-phase with an N number of phases,
    the stator cylindrical shaft or annular hub having N+1 number of the stator poles with the same N+1 number of the Delta-connected stationary windings, and
    all the Delta-connected stationary windings being axial windings.

26. A counter-rotatable generator as claimed in claim 22, further comprising:
    the stator being Delta-connected,
    the counter-rotatable generator being multi-phase with an N number of phases,
    the stator cylindrical shaft or annular hub having N+1 number of the stator poles with the same N+1 number of the Delta-connected stationary windings, and
    Delta-connected stationary radial end windings at opposite ends of the shaft or annular hub,
    and all the Delta-connected stationary windings between the axial end windings being axial windings.

* * * * *